United States Patent
Ezaki et al.

(10) Patent No.: US 8,873,609 B2
(45) Date of Patent: Oct. 28, 2014

(54) COMMUNICATION APPARATUS AND COMMUNICATION METHOD

(75) Inventors: Takato Ezaki, Yokohama (JP); Dai Kimura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 13/613,916

(22) Filed: Sep. 13, 2012

(65) Prior Publication Data

US 2013/0094560 A1 Apr. 18, 2013

(30) Foreign Application Priority Data

Oct. 17, 2011 (JP) .................................. 2011-227829

(51) Int. Cl.
*H04B 17/00* (2006.01)
*H04L 25/02* (2006.01)

(52) U.S. Cl.
CPC ........ *H04L 25/0222* (2013.01); *H04L 25/0224* (2013.01)
USPC ............ 375/226; 375/279; 375/308; 375/329

(58) Field of Classification Search
USPC .................................. 375/226, 279, 308, 329
See application file for complete search history.

(56) References Cited

U.S. PATENT DOCUMENTS

| 7,058,002 B1* | 6/2006 | Kumagai et al. ............... 370/203 |
| 7,130,360 B2* | 10/2006 | Lee et al. ...................... 375/316 |
| 2005/0070237 A1* | 3/2005 | Moriai et al. .............. 455/151.1 |

OTHER PUBLICATIONS

NTT DoCoMo "Discussion on AFC problem under high speed train environment" TSG-RAN Working Group 4 Meeting #38, Denver, USA, Feb. 13-17, 2006.
Paul H. Moose. "A Technique for Orthogonal Frequency Division Multiplexing Frequency Offset Correction" IEEE Transactions on Communications, vol. 42, No. 10, Oct. 1994.

* cited by examiner

*Primary Examiner* — Kabir A Timory
(74) *Attorney, Agent, or Firm* — Katten Muchin Rosenman LLP

(57) ABSTRACT

A communication apparatus including: a receiver to receive signals including reference signals at each of a plurality of different reception intervals; and a processor to estimate phase differences between the signals based on the reference signals, to determine a plurality of phase difference candidates for each of the reception intervals based on the phase differences, to select, from among a plurality of combinations of the phase difference candidates for the reception intervals, a combination of the phase difference candidates between the signals, and to estimate a frequency deviation of the signals based on the phase difference candidates included in the combination.

18 Claims, 13 Drawing Sheets

US 8,873,609 B2

COMMUNICATION APPARATUS AND COMMUNICATION METHOD

CROSS-REFERENCE TO RELATED APPLICATIONS

This application is based upon and claims the benefit of priority of the prior Japanese Patent Application No. 2011-227829, filed on Oct. 17, 2011, the entire contents of which are incorporated herein by reference.

FIELD

The embodiments discussed herein are related to a technique for a communication apparatus and a communication method for estimating a frequency deviation of received signals.

BACKGROUND

When a shielding material does not exist between a base station device and a mobile station device that moves at a high speed, an environment for propagation of a radio wave is a so-called Racian fading environment. It is known that, in such a case, a Doppler effect on received signals causes a frequency deviation and largely affects the quality of communication.

As a method for estimating the frequencies of received signals, the following method is known. The method is to calculate a correlation between reference signals received at different times and estimate the amount of a phase rotation in an interval between the times when the reference signals are received or estimate a phase difference. Let $s_k$ be a transmitted signal at a time k, let $h_k$ be a distortion that occurs in the signal due to a propagation path of the signal, let $\Delta f$ be a deviation of the frequency of the signal, and let $n_k$ be white Gaussian noise. Then, the received signal is given by the following Equation (1), $$r_k = e^{j2\pi \Delta f k} h_k s_k + n_k, \quad (1)$$

where $e^{j2\pi \Delta f k}$ denotes the phase rotation.

When a carrier wave is removed, the frequency deviation remains. Thus, the aforementioned phase rotation appears in Equation (1). In this case, a correlation $z(k, \tau)$ between the received signal $r_k$ at the time k and a received signal $r_{k+\tau}$ at a time $k+\tau$ is represented by the following Equation (2).

$$z(k, \tau) = r_{k+\tau} r_k^* = e^{j2\pi \Delta f \tau} h_{k+\tau} h_k^* s_{k+\tau} s_k^* + \\ e^{j2\pi \Delta f(k+\tau)} h_{k+\tau} s_{k+\tau} n_k^* + n_{k+\tau}(e^{j2\pi \Delta f k} h_k s_k)^* + n_{k+\tau} n_k^* \quad (2)$$

It is assumed that the propagation path does not change in a time period ti and the transmitted signal $s_k$ and a transmitted signal $s_{k+\tau}$ are the same. Based on this assumption, the average of correlations $z(k, \tau)$ is zero in the second term and later due to a characteristic of the white Gaussian noise. Thus, the following Equation (3) is established.

$$E[z(k,\tau)] = e^{j2\pi \Delta f \tau} \quad (3)$$

The frequency deviation $\Delta f$ can be estimated on the basis of the aforementioned results as indicated by the following Equation (4). Note that if the transmitted signals $s_k$ and $s_{k+\tau}$ are known, the frequency deviation $\Delta f$ can be estimated according to a simple modified equation.

$$\Delta f = \frac{\arg(E[z(k, \tau)])}{2\pi\tau} = \frac{1}{2\pi\tau} \tan^{-1}\left[\frac{\text{Im}(E[z(k, \tau)])}{\text{Re}(E[z(k, \tau)])}\right] \quad (4)$$

"3GPP (Third Generation Partnership Project) contribution, R4-060149, "Discussion on AFC problem under high speed train environment", NTT DoCoMo, USA, Feb. 13-17, 2006" and "P. Moose, "A Technique for Orthogonal Frequency Division Multiplexing Frequency Offset Correction", IEEE Trans. Commun., vol. 42, no. 10, October. 1994" are examples of related art.

SUMMARY

According to an aspect of the invention, a communication apparatus includes: a receiver to receive signals including reference signals at each of a plurality of different reception intervals; and a processor to estimate phase differences between the signals based on the reference signals, to determine a plurality of phase difference candidates for each of the reception intervals based on the phase differences, to select, from among a plurality of combinations of the phase difference candidates for the reception intervals, a combination of the phase difference candidates between the signals, and to estimate a frequency deviation of the signals based on the phase difference candidates included in the combination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An arctangent function $\tan^{-1}x$ ranges from $-\pi$ to $\pi$. Thus, according to the aforementioned estimation method, a range of the frequency deviation $\Delta f$ that can be estimated is limited to a range of $-\frac{1}{2}\tau$ to $\frac{1}{2}\tau$. When an estimated value of the amount of a phase rotation between the reference signals received at the time interval $\tau$ is $\theta$, it is not possible to determine whether a phase slowly rotates at the amount of $\theta$ in the time interval $\tau$ or rotates at an amount of $\theta+2\pi$ at a high speed.

An object of a device disclosed herein and a method disclosed herein is to enlarge a range of a frequency deviation that can be estimated.

1. Method for Calculating Frequency Deviation

Figure 1:
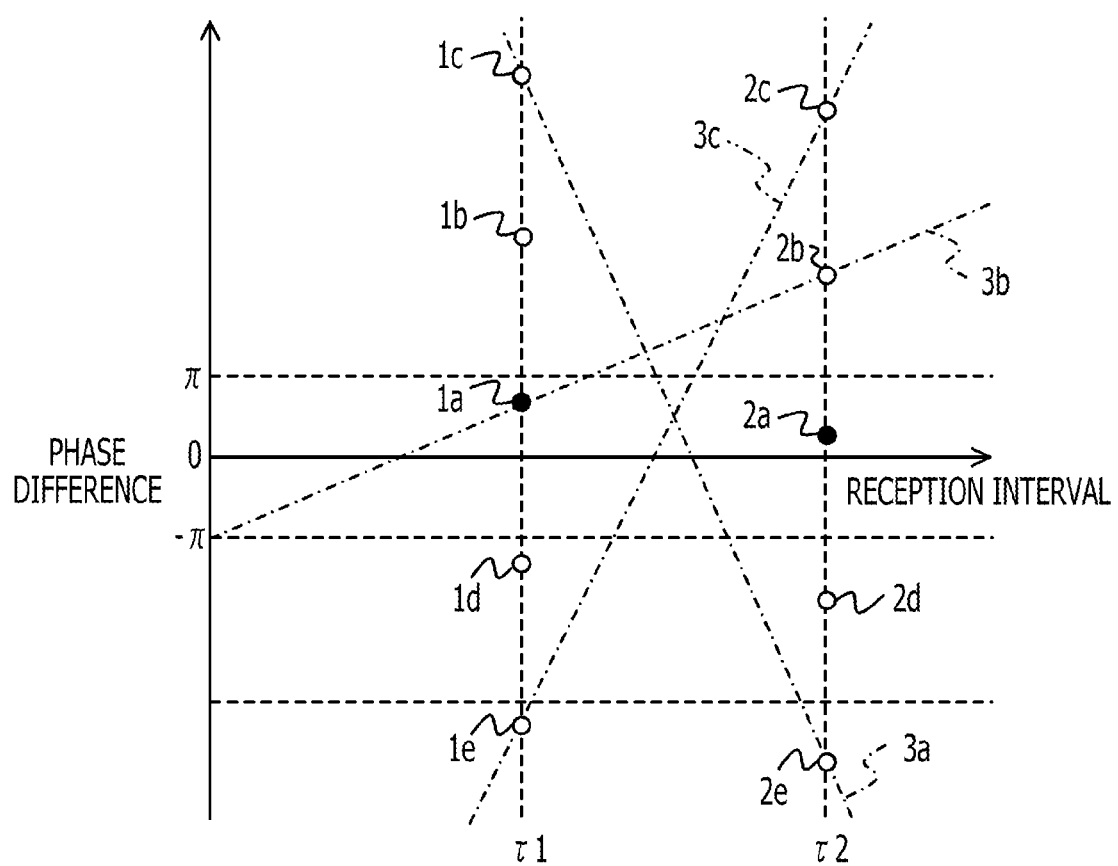
FIG. 1 is a diagram describing a method for calculating a frequency deviation.

Hereinafter, embodiments are described with reference to the accompanying drawings. First, a method for calculating a frequency deviation is described with reference to FIG. 1. FIG. 1 illustrates relationships between reception intervals between the times when reference signals are received and the amounts of phase rotations between the reference signals received at the reception intervals. In the following description, the amount of a phase rotation between reference signals received at a certain reception interval is referred to as a "phase difference" in some cases.

A reference symbol is indicates a phase difference $\theta 1$ that is estimated between reference signals received at a reception interval $\tau 1$ by calculating a correlation between the reference signals received at the reception interval $\tau 1$. A reference symbol $2a$ indicates a phase difference $\theta 2$ that is estimated between reference signals received at a reception interval $\tau 2$ by calculating a correlation between the reference signals received at the reception interval $\tau 2$ that is longer than the reception interval $\tau 1$. In the following description, an additional character "n" is used as a number identifying a reception interval between the times when reference signals are received. A phase difference that is estimated by calculating a correlation between reference signals received at a reception interval $\tau n$ is indicated by $\theta n$.

For the phase difference $\theta n$, the direction and amount of a phase rotation are arbitrary. In this case, the amount of the phase rotation is one or more rotations. In an embodiment, a candidate $\theta n(m)$ for the phase difference $\theta n$ is determined by the following Equation (5).

$$\theta_n(m)=\theta_n+2\pi m, m \in Z \quad (5)$$

In the following description, a candidate for a phase difference is referred to as a "phase difference candidate" in some cases. A phase difference candidate that is determined on the basis of a phase difference estimated between reference signals received at a reception interval $\tau n$ is referred to as a "phase difference candidate for the reception interval $\tau n$" in some cases. In the example illustrated in FIG. 1, reference symbols $1a$ to $1e$ indicate phase difference candidates $\theta 1(m)$ for the reception interval $\tau 1$. The phase difference candidates $1a$, $1b$, $1c$, $1d$ and $1e$ correspond to symbols $\theta 1(0)$, $\theta 1(1)$, $\theta 1(2)$, $\theta 1(-1)$ and $\theta 1(-2)$, respectively. Similarly, reference symbols $2a$ to $2e$ indicate phase difference candidates $\theta 2(m)$ for the reception interval $\tau 2$. The phase difference candidates $2a$, $2b$, $2c$, $2d$ and $2e$ correspond to symbols $\theta 2(0)$, $\theta 2(1)$, $\theta 2(2)$, $\theta 2(-1)$ and $\theta 2(-2)$, respectively.

A number m is an arbitrary integer. A range of a frequency deviation that can be estimated is determined on the basis of a range of the number m. Thus, the range of the number m is determined on the basis of a desired range of the frequency deviation. For example, if the frequency deviation to be estimated is in a range of $-\Delta f$max to $+\Delta f$max, the range of the number m is determined so that requirements indicated in the following Formulas (6) are at least satisfied. A plurality of phase difference candidates determined for each of reception intervals $\tau n$ are identified by integers m. Thus, the integers m are referred to as candidate numbers in some cases in the following description.

$$\tau\max = \max_n \{\tau_n\}, \quad (6)$$

$$\left\lfloor -2\tau\max\Delta f\max + \frac{1}{2} \right\rfloor \leq m \leq \left\lceil 2\tau\max\Delta f\max - \frac{1}{2} \right\rceil$$

$$\text{where, } \Delta f\max > \frac{1}{2\tau\max}$$

For example, when the maximum reception interval $\tau$max is 500 microseconds, and the maximum frequency deviation $\Delta f$max is 2000 Hz, the candidate numbers m are in a range of $-1$ to 1 in the aforementioned Formula (6). In this case, the candidate numbers m are $-1$, 0 and 1.

Next, a phase difference candidate that is closest to a phase difference between signals received at each of the reception intervals $\tau n$ is selected from among phase difference candidates $\theta n(m)$ for each of the reception intervals $\tau n$. If the frequency deviation is a certain fixed value, a phase difference increases in proportion to a reception interval. When the reception interval is 0, the phase difference is 0. Thus, a phase difference that occurs in a reception interval due to the frequency deviation is directly proportional to the reception interval.

In the embodiment, combinations of phase difference candidates $\theta n(m)$ for the reception intervals $\tau n$ are formed. FIG. 1 illustrates a combination of a phase difference candidate is (phase difference candidate $\theta 1(2)$) for the reception interval $\tau 1$ and a phase difference candidate $2e$ (phase difference candidate $\theta 2(-2)$) for the reception interval $\tau 2$. In addition, FIG. 1 illustrates a combination of a phase difference candidate is (phase difference candidate $\theta 1(0)$) for the reception interval $\tau 1$ and a phase difference candidate $2b$ (phase difference candidate $\theta 2(1)$) for the reception interval $\tau 2$. Furthermore, FIG. 1 illustrates a combination of a phase difference candidate $1e$ (phase difference candidate $\theta 1(-2)$) for the reception interval $\tau 1$ and a phase difference candidate $2c$ (phase difference candidate $\theta 2(2)$) for the reception interval $\tau 2$. Other combinations of phase difference candidates are formed in the same manner.

A combination that satisfies the aforementioned relationship between the reception interval and the phase difference is selected from among the formed combinations of the phase difference candidates. In an embodiment, a combination that causes an intercept of an approximate straight line indicating the relationships between the reception intervals and phase difference candidates to be closest to the origin is selected. FIG. 1 illustrates an approximate straight line $3a$ connecting the phase difference candidates $1c$ and $2e$ to each other, an approximate straight line $3b$ connecting the phase difference candidates $1a$ and $2b$ to each other, and an approximate straight line $3c$ connecting the phase difference candidates $1e$ and $2c$ to each other. Among intercepts of the approximate straight lines $3a$ to $3c$, the intercept of the approximate straight line $3b$ (connecting the phase difference candidates $1a$ and $2b$ to each other) is closest to the origin. Thus, the combination of the phase difference candidates $1a$ and $2b$ is selected.

In the following description, a selected combination of phase difference candidates is indicated by $(m^\wedge 1, m^\wedge 2, \ldots)$ in some cases. A symbol $(m^\wedge n)$ $(n=1, 2, \ldots)$ indicates a candidate number that indicates a phase difference candidate for a reception interval τn, while the phase difference candidate is included in the selected combination of the phase difference candidates.

In another embodiment, the least mean square errors are calculated from approximate straight lines that indicate the relationships between the reception intervals and the phase difference candidates included in the combinations when the approximate straight lines are formed so as to extend through the origin. A combination that causes the least mean square error to be minimal is selected from among the combinations of the phase difference candidates. In another embodiment, a combination that causes the difference between the ratios of phase difference candidates of the combination to the reception intervals to be minimal is selected from among the combinations of the phase difference candidates.

Phase difference candidates that are included in a combination selected in any of the aforementioned embodiments are expected to be closest to phase differences that actually occur in the reception intervals τn due to the frequency deviation. After that, the frequency deviation is calculated by dividing a value of a phase difference candidate θn (m^n) for the received interval τn by the reception interval τn. In this case, the phase difference candidate θn (m^n) is included in the selected combination.

In the present embodiment, phase difference candidates for each of the reception intervals are determined on the basis of a correlation between reference signals received at the different reception intervals, and an actual phase difference occurred in each of the reception intervals is selected from among phase difference candidates on the basis of relationships between phase difference candidates for the different reception intervals. Thus, even when a range of phase difference candidates is enlarged, and the difference between an actual phase difference and a phase difference estimated on the basis of a correlation between reference signals received at a certain reception interval is equal to or larger than one rotation, the actual phase difference can be estimated. Thus, the range of the frequency deviation that can be estimated is enlarged.

2. First Embodiment

2.1. Example of Hardware Configuration of Receiver

A first embodiment of a receiver that uses the aforementioned method for calculating a frequency deviation is described below. In the present specification, as an example of the receiver, a base station device that is used for a mobile communication system is described below. The following description, however, does not mean that the method (described in the present specification) for calculating a frequency deviation is applied only to station base devices. The method (described in the present specification) for calculating a frequency deviation can be used by a receiver of another type.

Figure 2:
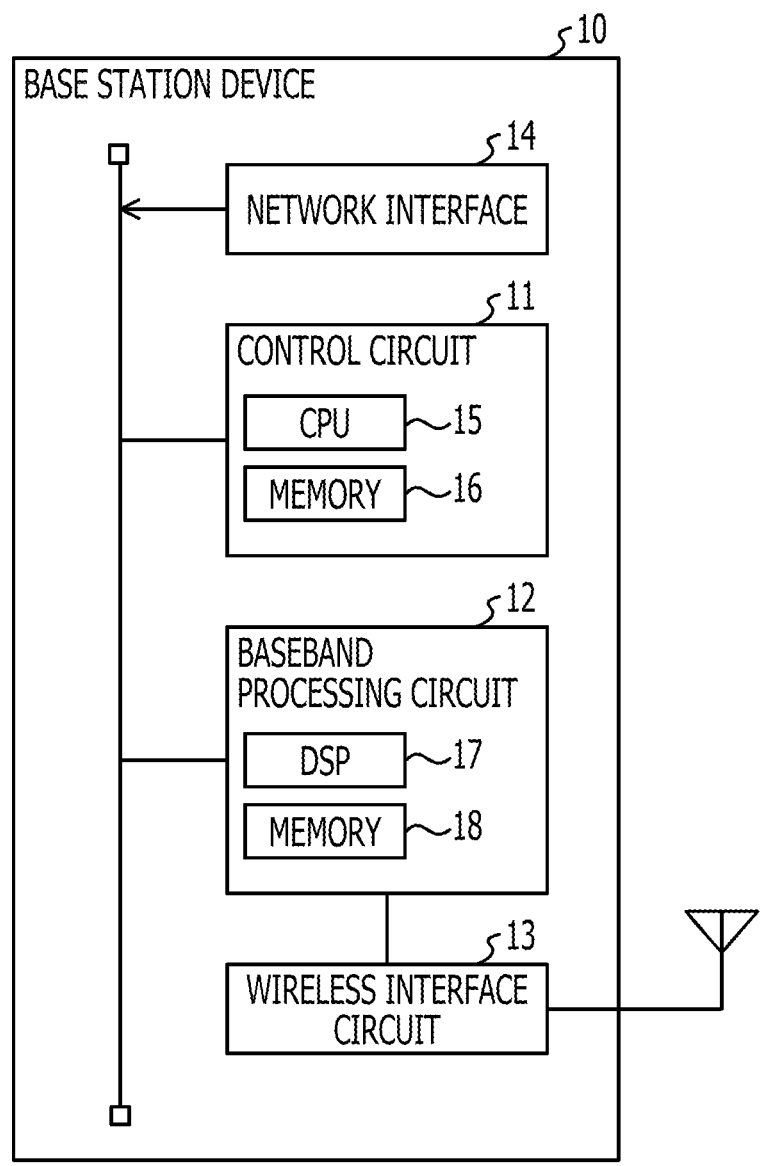
FIG. 2 is a diagram illustrating an example of a hardware configuration of a base station device.

FIG. 2 is a diagram illustrating an example of a hardware configuration of the base station device. A base station device 10 may be a base station device that is used for a mobile communication system that uses Long Term Evolution (LTE). LTE is being standardized by Third Generation Partnership Project (3GPP). The base station device 10 includes a control circuit 11, a baseband processing circuit 12, a wireless interface circuit 13 and a network interface 14. The control circuit 11 is a circuit that controls all operations of the base station device 10. The control circuit 11 includes a central processing unit (CPU) 15 and a memory 16. The CPU 15 executes a computer program stored in the memory 16 and thereby executes various processes for operations of the base station device 10.

The baseband processing circuit 12 executes a baseband process on a signal received from a mobile station device and a signal to be transmitted to the mobile station device. The baseband processing circuit 12 executes a process (described later) of calculating a frequency deviation. For example, the baseband processing circuit 12 includes a digital signal processor (DSP) 17 and a memory 18. Firmware is stored in the memory 18 and executed by the DSP 17. The DSP 17 executes a computer program stored in the memory 18 and thereby executes the baseband process and the process of calculating a frequency deviation.

In another embodiment, the baseband processing circuit 12 may include logical circuits such as a large scale integration (LSI), an application specific integrated circuit (ASIC) and a field-programming gate array (FPGA). The process (described later) of calculating a frequency deviation may be executed by the logical circuits.

The wireless interface circuit 13 is an interface circuit that is used to perform wireless communication between the base station device 10 and the mobile station device. The network interface 14 is a communication interface circuit that is used to perform communication between the base station device 10 and another base station device and between the base station device 10 and an upstream-side node.

2.2. Functional Configuration of Receiver

Figure 3:
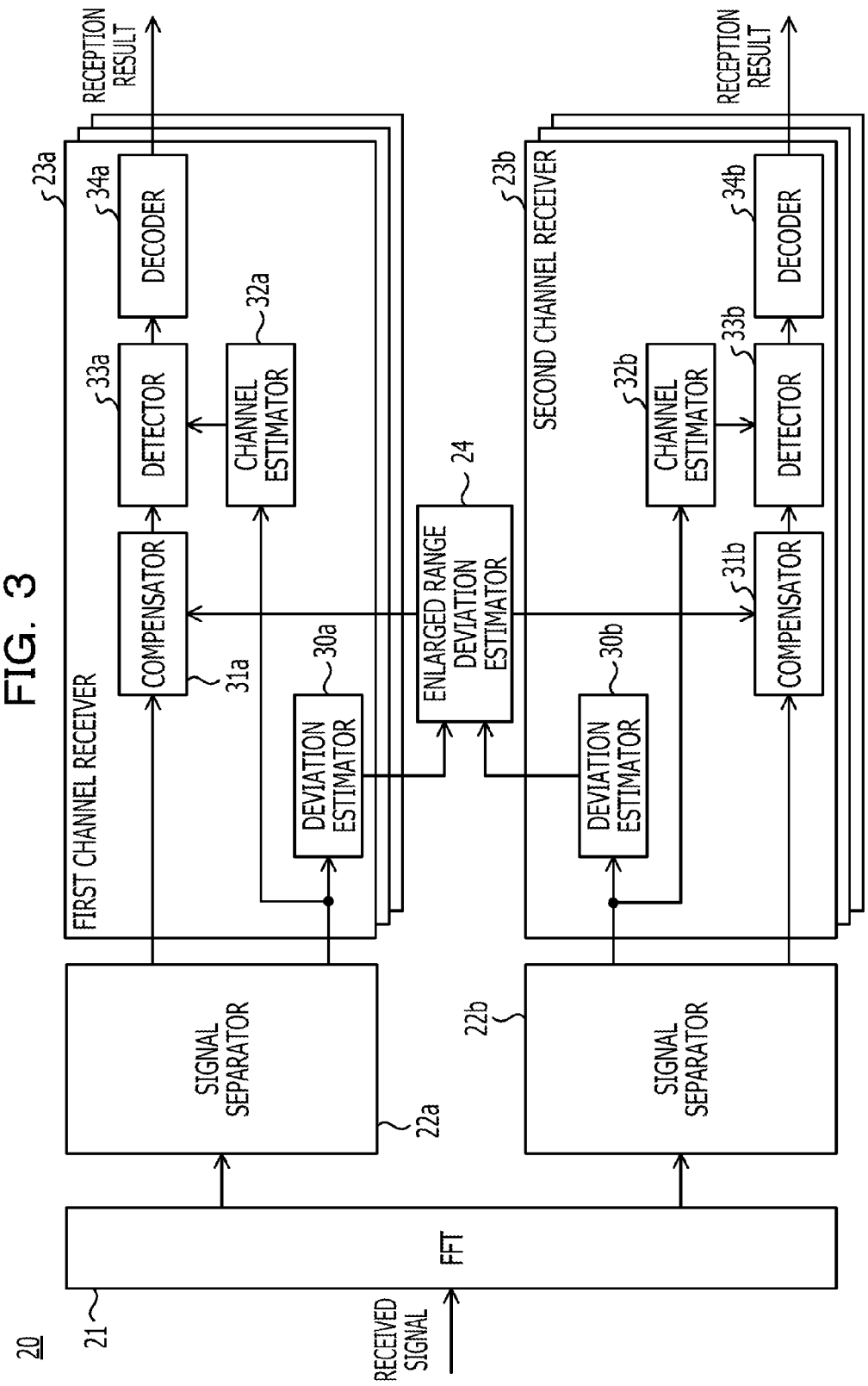
FIG. 3 is a functional block diagram illustrating a first example of a receiving circuit.

Next, a receiving circuit that is included in the base station device 10 and receives a wireless signal from the mobile station device is described. FIG. 3 is a functional block diagram illustrating a first example of the receiving circuit. FIG. 3 mainly illustrates functions that are related to the following description. A receiving circuit 20 may include a constituent element other than constituent elements illustrated in FIG. 3. Signal processing that is executed by the receiving circuit 20 is executed by causing the DSP 17 of the baseband processing circuit 12 to execute the computer program stored in the memory 18. In another embodiment, the signal processing may be executed by any of the logical circuits that are the LSI, the ASIC and the FPGA and included in the baseband processing circuit 12.

The receiving circuit 20 includes a fast Fourier transforming unit 21, signal separators 22a and 22b, a first channel receiver 23a, a second channel receiver 23b and an enlarged range deviation estimator 24. The fast Fourier transforming unit 21 is indicated by "FFT" in some of the accompanying drawings. The fast Fourier transforming unit 21 performs fast Fourier transformation so as to convert a baseband signal received from the wireless interface circuit 13 into a frequency domain signal. The fast Fourier transforming unit 21 separates the frequency domain signal into a signal for a first channel and a signal for a second channel. The fast Fourier transforming unit 21 transmits the signal for the first channel to the signal separator 22a and transmits the signal for the second channel to the signal separator 22b. In another embodiment, Physical Uplink Shared Channel (PUSCH) and Physical Uplink Control Channel (PUCCH) that are used in LTE may be used as the first and second channels.

The signal separator 22a separates the signal for the first channel into signals for users and further separates each of the signals for the users into data and a reference signal. The signal separator 22a outputs the separated data and signals to the first channel receiver 23a. Similarly, the signal separator 22b separates the signal for the second channel into signals for users and further separates each of the signals for the users into data and a reference signal. The signal separator 22b outputs the separated data and signals to the second channel receiver 23b. The signal processing that is executed by the signal separators 22a and 22b may be executed by the same circuit using time-sharing processing. Signal processing that is executed by the first channel receiver 23a and the second channel receiver 23b may be executed by the same circuit using time-sharing processing.

The first channel receiver 23a includes a deviation estimator 30a, a compensator 31a, a channel estimator 32a, a detector 33a and a decoder 34a. The deviation estimator 30a calculates a correlation between reference signals of the first channel and thereby estimates a phase difference between the reference signals of the first channel that have been received at a reception interval. The deviation estimator 30a outputs the estimated phase difference to the enlarged range deviation estimator 24.

The compensator 31a compensates for a frequency deviation of the data of the first channel on the basis of a frequency deviation of the received signals that has been estimated by the enlarged range deviation estimator 24 using the method (described above in Item "1. Method for Calculating Frequency Deviation") for calculating a frequency deviation. The channel estimator 32a executes a channel estimation on the basis of the reference signals of the first channel. The detector 33a executes channel equalization on the data of the first channel on the basis of a propagation path value estimated by the channel estimator 32a and demodulates the data. The decoder 34a decodes the demodulated data.

The second channel receiver 23b has the same configuration as the first channel receiver 23a. The second channel receiver 23b estimates a frequency deviation of reference signals of the second channel. The second channel receiver 23b executes a channel estimation on the basis of the reference signals of the second channel and compensates for the frequency deviation of data of the second channel. The second channel receiver 23b executes channel equalization on the data of the second channel, and modulates and decodes the data of the second channel.

The enlarged range deviation estimator 24 executes the process (described in "Item 1. Method for Calculating Frequency Deviation") of calculating a frequency deviation on the basis of the phase differences in reception intervals between the times when the reference signals of the first and second channels are received, while the phase differences have been estimated by the deviation estimators 30a and 30b. In the following description, the calculation process described in "Item 1. Method for Calculating Frequency Deviation" is referred to as an "enlarged range deviation estimation" in some cases.

The reception interval between the times when the reference signals of the first channel are received is indicated by τ1, while the reception interval between the times when the reference signals of the second channel are received is indicated by τ2. The phase difference estimated by the deviation estimator 30a is indicated by θ1, while the phase difference estimated by the deviation estimator 30b is indicated by θ2. The reception intervals τ1 and τ2 are different from each other.

Figure 4:
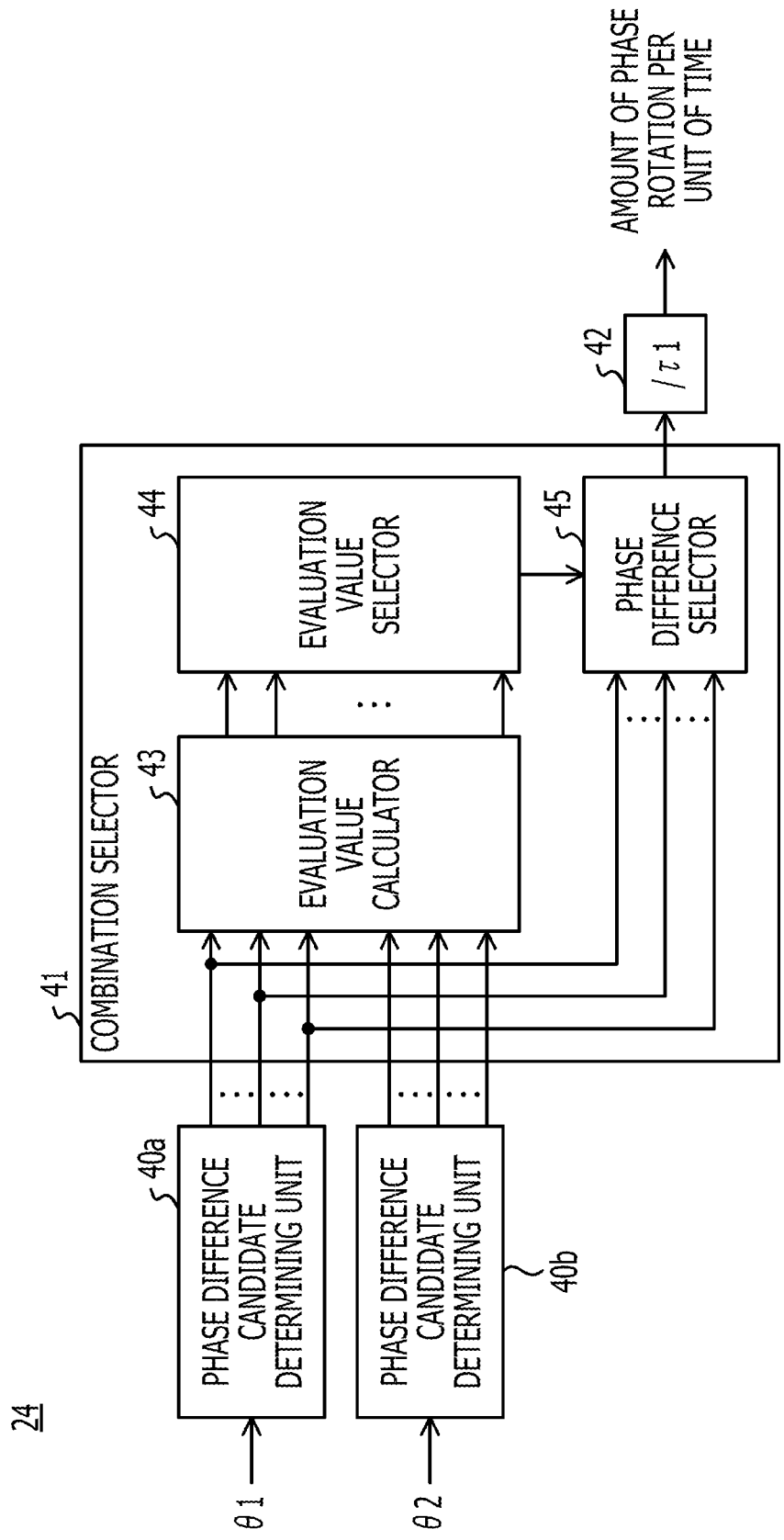
FIG. 4 is a functional block diagram illustrating a first example of an enlarged range deviation estimator.

FIG. 4 is a functional block diagram illustrating a first example of the enlarged range deviation estimator 24. The enlarged range deviation estimator 24 executes the enlarged range deviation estimation on the basis of the phase differences θ1 and θ2 estimated by the deviation estimators 30a and 30b. The enlarged range deviation estimator 24 includes phase difference candidate determining units 40a and 40b, a combination selector 41 and a frequency deviation calculator 42.

The phase deviation candidate determining unit 40a determines phase difference candidates θ1(m) for the reception interval τ1 on the basis of the phase difference θ1 estimated by the deviation estimator 30a. The phase deviation candidate determining unit 40b determines phase difference candidates θ2(m) for the reception interval τ2 on the basis of the phase difference θ2 estimated by the deviation estimator 30b. In the following description, the integer m is in a range of −M to M.

The combination selector 41 forms combinations of the phase difference candidates θ1(m) for the reception interval τ1 and the phase difference candidates θ2(m) for the reception interval τ2 and selects, from among the formed combinations, a combination (m^1, m^2) of phase differences between signals received at the reception intervals τ1 and τ2. The combination selector 41 includes an evaluation value calculator 43, an evaluation value selector 44 and a phase difference selector 45.

The evaluation value calculator 43 calculates, for each of the combinations of the phase difference candidates θ1(m) and θ2(m), an evaluation value that indicates differences between the phase difference candidates of the combination and actual phase differences between signals received at the reception intervals τ1 and τ2. For example, each of the evaluation values may be a value of an intercept of an approximate straight line indicating the relationships between phase difference candidates included in an interested combination and the reception intervals. In addition, each of the evaluation values may be the least mean square error obtained from an approximate straight line that indicates the relationships between phase difference candidates included in an interested combination and reception intervals and is formed so as to extend through the origin. In addition, each of the evaluation values may be the difference between the ratios of phase difference candidates included in an interested combination to the reception intervals.

The evaluation value selector 44 selects, from among the evaluation values calculated for the combinations, the most appropriate evaluation value or an evaluation value calculated for a combination of phase difference candidates that are closest to the actual phase differences. The phase difference selector 45 selects a phase difference candidate θ1(m^1) for the reception interval τ1, while the phase difference candidate θ1(m^1) for the reception interval τ1 is included in a combination of phase difference candidates for which the most appropriate evaluation value has been calculated. The phase difference selector 45 outputs the selected phase difference candidate θ1(m^1) to the frequency deviation calculator 42.

The frequency deviation calculator 42 divides the phase difference candidate θ1(m^1) by the reception interval τ1, thereby calculates a phase rotation amount (θ1(m^1)/τ1) per unit time, and outputs the calculated phase rotation amount to the compensators 31a and 31b as a frequency deviation. The frequency deviation calculator 42 may calculate the frequency deviation and output the calculated frequency deviation. In the following description, the phase rotation amount per unit time is referred to as a "frequency deviation".

2.3. Process to be Executed by Receiver

Figure 5:
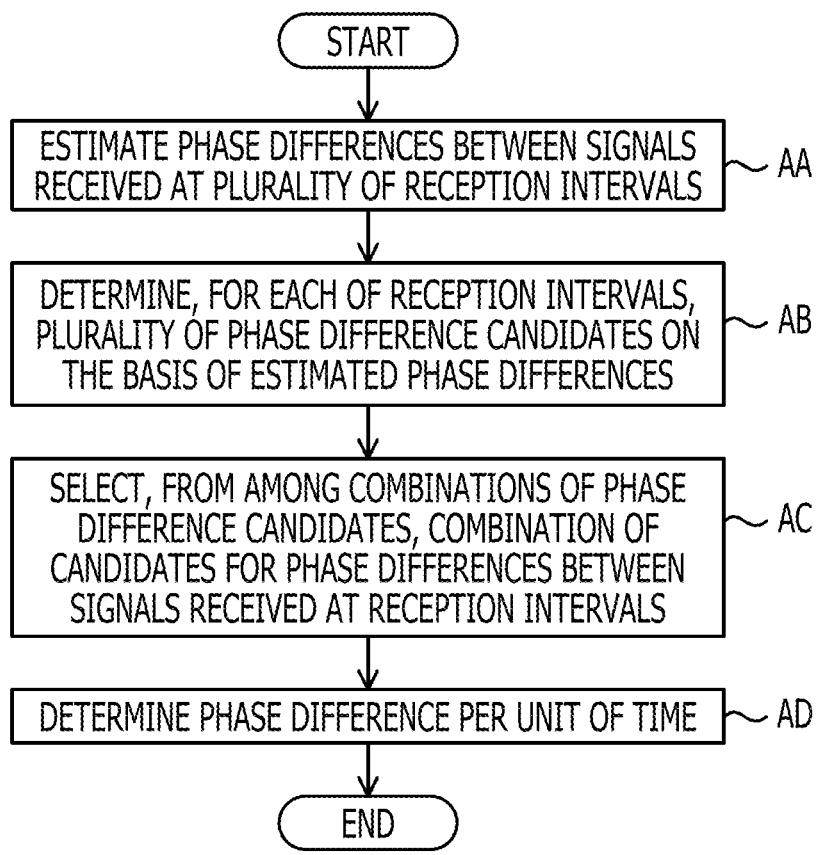
FIG. 5 is a diagram describing an example of a process that is executed by the receiving circuit.

A process that is executed by the receiving circuit 20 is described below. FIG. 5 is a diagram illustrating an example of the process that is executed by the receiving circuit 20. Hereinafter, a series of processes that are described with reference to FIG. 5 may be interpreted as a method that includes a plurality of procedures. In this case, "operations" may be interpreted as "steps". The same applies to cases illustrated in FIGS. 7 and 11.

In operation AA, the deviation estimator 30a calculates a correlation between the reference signals of the first channels and thereby estimates a phase difference θ1 between signals received at the reception interval τ1, and the deviation estimator 30b calculates a correlation between the reference signals of the second channels and thereby estimates a phase difference θ2 between signals received at a reception interval τ2.

In operation AB, the phase difference candidate determining units 40a and 40b determine phase difference candidates θ1(m) and θ2(m) for the reception intervals τ1 and τ2 on the basis of the phase differences θ1 and θ2 estimated by the deviation estimators 30a and 30b. In operation AC, the combination selector 41 selects, from among combinations of the phase difference candidates θ1(m) and θ2(m), a combination (m^1, m^2) of candidates for the phase differences between the signals received at the reception intervals τ1 and τ2.

In operation AD, the frequency deviation calculator 42 divides the phase difference candidate θ1(m^1) for the reception interval τ1 by the reception interval τ1 and thereby calculates a frequency deviation, while the phase difference candidate θ1(m^1) for the reception interval τ1 is included in the selected combination (m^1, m^2) of the phase differences candidates.

2.4. Effects of Embodiment

As described above, the direction and amount of a phase rotation are arbitrary, while the amount of the phase rotation is estimated on the basis of reference signals received at a single reception interval τ and is one or more rotations. Thus, the range of the frequency deviation Δf that can be estimated is limited to a range from $-\frac{1}{2}\tau$ to $\frac{1}{2}\tau$. In the present embodiment, a plurality of phase difference candidates for each of different reception intervals are determined on the basis of reference signals received at the reception intervals, and an actual phase difference between signals received at each of the reception intervals can be selected from among the phase difference candidates. Even when the difference between a phase difference estimated from a correlation between reference signals received at each of the reception intervals and an actual phase difference is equal to or larger than one rotation, the actual phase difference can be estimated. Thus, the range of the frequency deviation that can be estimated is enlarged.

For example, it is assumed that reference signals of PUSCH and PUCCH are used in order to estimate a frequency deviation. An interval between the times when the reference signals of PUSCH are received is 500 microseconds, while an interval between the times when the reference signals of PUCCH are received is 285.417 microseconds. A frequency deviation that can be estimated from the reference signals of PUSCH is in a range of ±1000 Hz, while a frequency deviation that can be estimated from the reference signals of PUCCH is approximately in a range of ±1751 Hz. A frequency deviation that occurs when a user moves at a speed of 350 km/h reaches approximately 1300 Hz in a 2 GHz band and approximately 2300 Hz in a 3.6 GHz range. Thus, the range of the frequency deviation may be insufficient depending on the situation.

In the method for calculating a frequency deviation according to the present embodiment, when a range m is in a range of −1 to 1, the range of the frequency deviation that can be estimated is enlarged to ±3000 Hz that is equivalent to three times a frequency deviation that can be estimated from the reference signals of PUSCH. When the range m is in a range of −2 to 2, the range of the frequency deviation that can be estimated is enlarged to ±5000 Hz. The range of the frequency deviation that can be estimated can be enlarged by increasing the range of the integer m. Thus, it is possible to avoid a lack of the range of the frequency deviation that can be estimated.

In the first embodiment, as the reference signals received at the different reception intervals τ1 and τ2, the reference signals that are transmitted in the different first and second channels are used. Instead of the reference signals that are transmitted in the different first and second channels, reference signals that are transmitted in the same channel at different time intervals may be used as the reference signals received at the reception intervals τ1 and τ2. The same applies to the following embodiments. In the first embodiment, the two types of reference signals received at the reception intervals τ1 and τ2 are used. Three or more types of reference signals that are received at three or more different reception intervals may be used. The same applies to the third to seventh embodiments.

3. Second Embodiment

An example of a detailed configuration for estimating a frequency deviation on the basis of the two types of reference signals received at the reception intervals τ1 and τ2 are described below. In a second embodiment, a combination of phase difference candidates, which causes an intercept of an approximate straight line indicating the relationships between the reception intervals τ1 and τ2 and the phase difference candidates to be closest to the origin, is selected from among combinations of the phase difference candidates θ1(m) and θ2(m) for the reception intervals τ1 and τ2, and a frequency deviation is calculated from the phase difference candidates included in the selected combination.

A candidate number m1 indicates any of the plurality of phase difference candidates θ1(m), while a candidate number m2 indicates any of the plurality of phase difference candidates θ1(m). An approximate straight line that indicates the relationships between the reception intervals and phase difference candidates θ1(m) and θ2(m) of a combination and extends through the phase difference candidates θ1(m) and θ2(m) are represented by the following Equation (7).

$$L_{m1,m2}(\tau) = \frac{\theta1(m1) - \theta2(m2)}{\tau1 - \tau2}\tau + \frac{\tau1\theta2(m2) - \tau2\theta1(m1)}{\tau1 - \tau2} \quad (7)$$

Equation (7) indicates an intercept of the approximate straight line. A combination (m^1, m^2) that causes an intercept to be closest to the origin is represented by the following Equation (8).

$$(m^\wedge 1, m^\wedge 2) = \arg\min_{m1,m2} \{|\tau1\theta2(m2) - \tau2\theta1(m1)|\} \quad (8)$$

Figure 6:
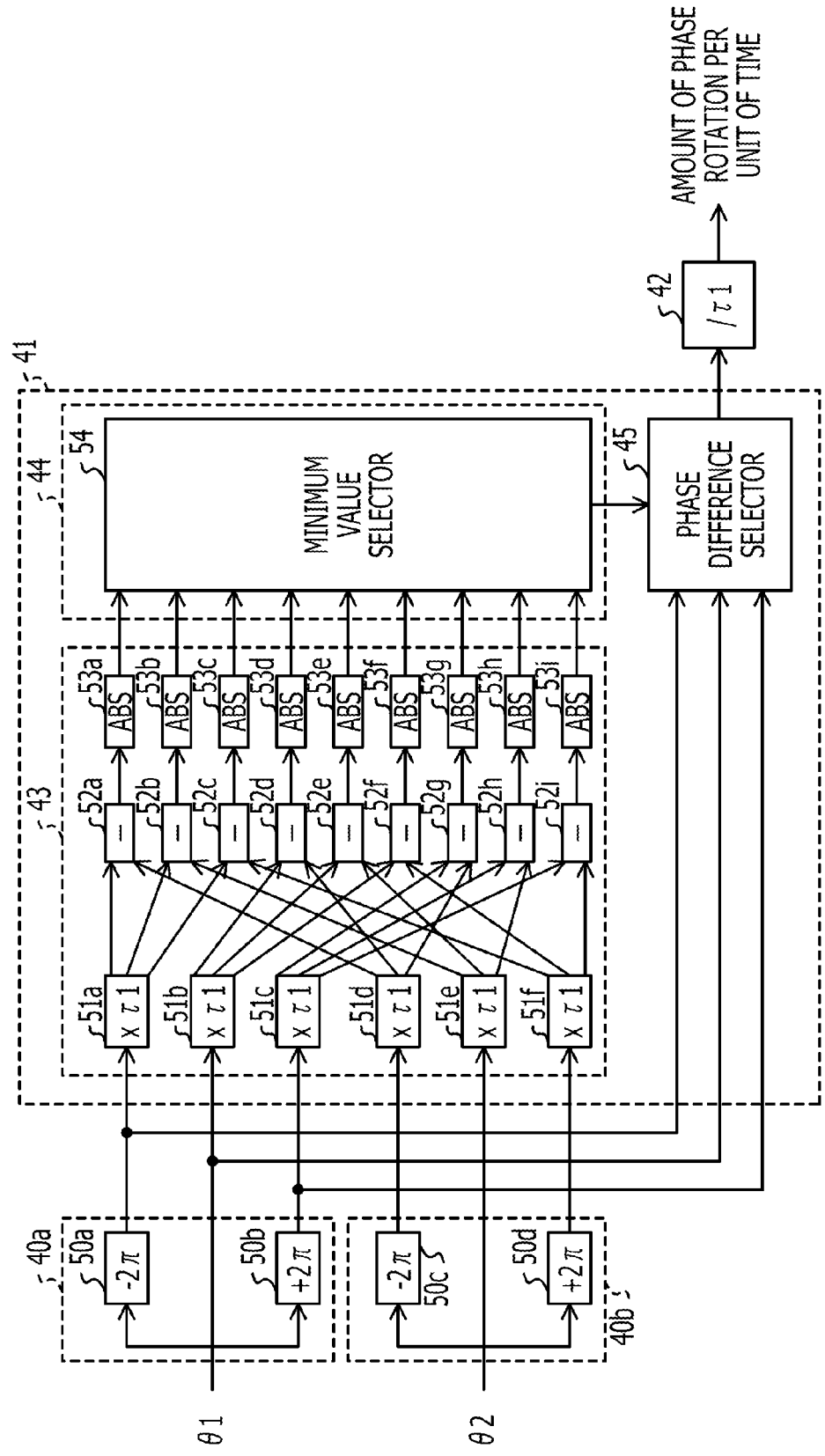
FIG. 6 is a functional block diagram illustrating a second example of the enlarged range deviation estimator.

An example of functional blocks of the enlarged range deviation estimator 24 that selects a combination of phase difference candidates in accordance with Equation (8) is described below with reference to FIG. 6. FIG. 6 illustrates a configuration when the integer m is in a range from −1 to 1. The range of the integer m, however, may be increased.

The phase difference candidate determining unit 40a includes a subtractor 50a and an adder 50b. The phase difference candidate determining unit 40b includes a subtractor 50c and an adder 50d. The subtractor 50a subtracts 2π from the phase difference θ1 estimated by the deviation estimator 30a and thereby calculates a candidate θ1(−1) for the phase difference θ1 between the reference signals received at the reception interval τ1. The adder 50b adds 2π to the phase difference θ1 and thereby calculates a phase difference candidate θ1(1). The phase difference candidate determining unit 40*a* outputs the phase difference θ1, the phase difference candidate θ1(−1) and the phase difference candidate θ1(1). The phase difference θ1 is a phase difference candidate θ1(0). In the same manner, the phase difference candidate determining unit 40*b* outputs the phase difference θ2(0), a phase difference candidate θ2(−1) and a phase difference candidate θ2(1).

The evaluation value calculator 43 includes multipliers 51*a* to 51*f*, subtractors 52*a* to 52*i* and absolute value calculators 53*a* to 53*i*. The evaluation value calculator 43 calculates, for each of the combinations of the phase difference candidates, an evaluation value v=|τ1θ2(m2)−τ2θ1(m1)|. The evaluation value selector 44 includes a minimum value selector 54 that selects the minimum value among the evaluation values calculated by the evaluation value calculator 43. The phase difference selector 45 selects a phase difference candidate (m^1) for the reception interval τ1, while the phase difference candidate (m^1) for the reception interval τ1 is included in a combination (m^1, m^2) of phase difference candidates from which the evaluation value selected by the minimum value selector 54 has been calculated. Then, the phase difference selector 45 outputs the selected phase difference candidate (m^1) to the frequency deviation calculator 42.

In the present embodiment, since the range of the frequency deviation that can be estimated can be enlarged in order to estimate the frequency deviation on the basis of the two types of the reference signals received at the reception intervals τ1 and τ2, it is possible to avoid a lack of the range of the frequency deviation that can be estimated.

4. Third Embodiment

An example of a detailed configuration for estimating a frequency deviation on the basis of reference signals received at two or more different reception intervals is described below. In a third embodiment, an approximate straight line, which indicates the relationships between the reception intervals and phase difference candidates included in combinations of phase difference candidates for the difference reception intervals, is formed so as to extend through the origin, and a combination that causes the least mean square error to be minimal is selected from among the combinations. In the third embodiment, a frequency deviation is calculated from phase difference candidates included in the selected combination. In the following description, the frequency deviation is estimated on the basis of reference signals transmitted through a number N (N is an integer of 2 or more) of channels and received at a number N of reception intervals.

A candidate number that indicates any of phase difference candidates θ1(m), a candidate number that indicates any of phase difference candidates θ2(m), . . . , and a candidate number that indicates any of phase difference candidates θN(m), are indicated by m1, m2, . . . , and mN, respectively. An approximate straight line that has an intercept of 0 and is calculated by the least squares method on the basis of combinations of the phase difference candidates θ1(m), θ2(m), . . . , and θN(m) is represented by the following Equation (9).

$$L_{m1,m2,\ldots,mN}(\tau) = \frac{\sum_{n=1}^{N} \tau n \theta n(mn)}{\sum_{n=1}^{N} \tau n^2} \tau \quad (9)$$

The least mean square error of the approximate straight line of Equation (9) is represented by the following Equation (10).

$$Err(m1, m2, \ldots, mN) = \sum_{n=1}^{N} (L_{m1,m2,\ldots,mN}(\tau n) - \theta n(mn))^2 \quad (10)$$

In the present embodiment, the evaluation value calculator 43 calculates, as evaluation values, the least mean square errors Err (m1, mr, . . . , and mN) for the combinations of the phase difference candidates θ1(m), θ2(m), . . . , and θN(m). The evaluation value selector 44 selects the smallest one of the least mean square errors Err (m1, mr, . . . , and mN) calculated by the evaluation value calculator 43.

Figure 7:
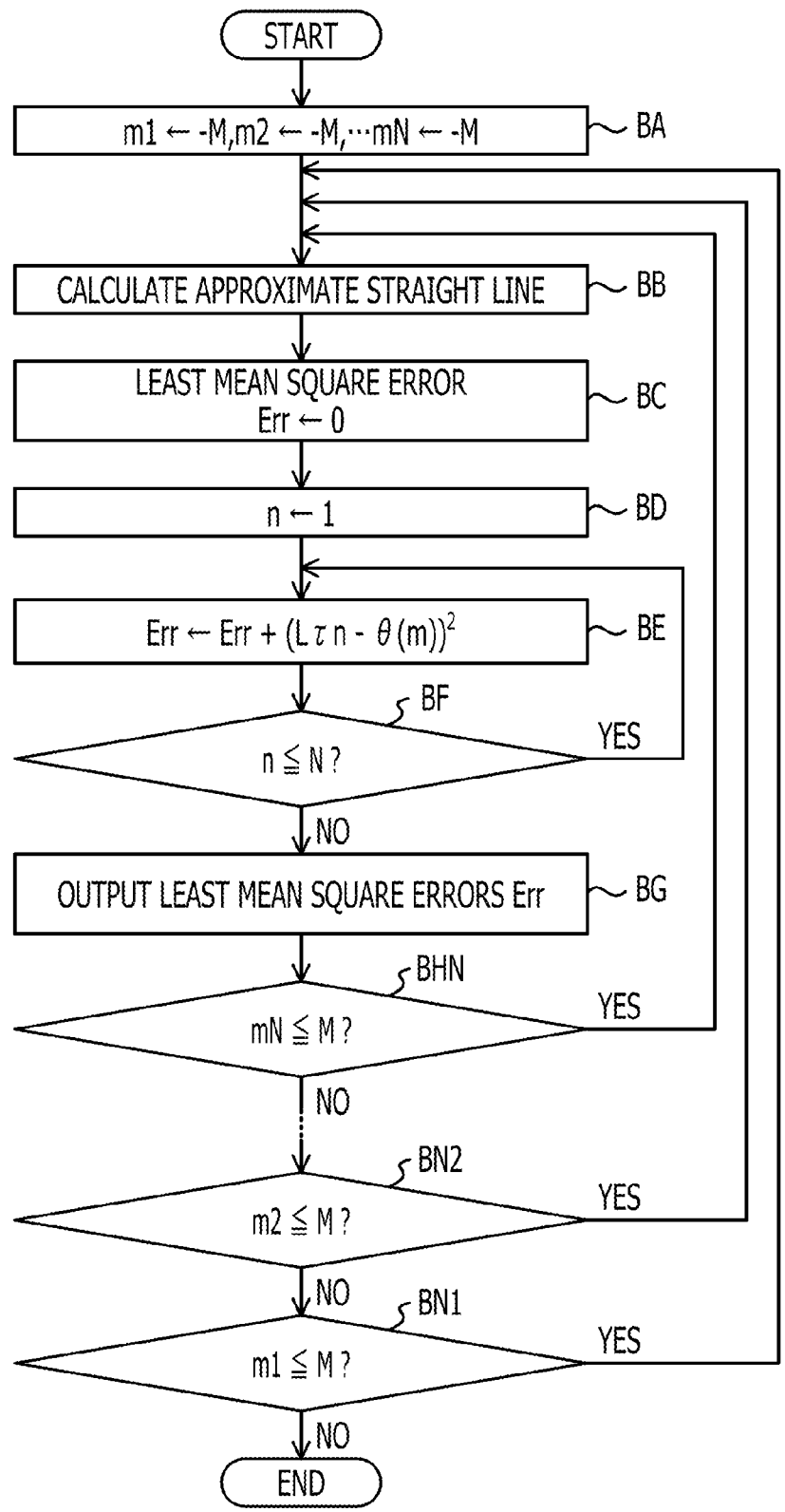
FIG. 7 is a diagram describing an example of a method for calculating evaluation values.

FIG. 7 is a diagram illustrating an example of a method for calculating evaluation values. In operation BA, the evaluation value calculator 43 initiates a variable m1 indicating any of the phase difference candidates θ1(m), a variable m2 indicating any of the phase difference candidates θ2(m), . . . , and a variable mN indicating any of the phase difference candidates θN(m) so as to set the variables m1, m2, . . . , and mN to "−M". In operation BB, the evaluation value calculator 43 calculates the approximate straight line indicated by the aforementioned Equation (9). In operation BC, the evaluation value calculator 43 initiates a value of a variable to be used to calculate the least mean square errors so as to set the value of the variable to "0".

In operation BD, the evaluation value calculator 43 initiates a loop variable n so as to set the loop variable n to "1". In operation BE, the evaluation value calculator 43 accumulates a value obtained by calculating the following Formula (II) in the variable Err to be used to calculate the least mean square errors.

$$L_{m1,m2,\ldots,mN}(\tau n) - \theta n(mn) \quad (11)$$

In operation BF, the evaluation value calculator 43 determines whether or not the loop variable n is equal to or smaller than N. When the loop variable n is equal to or smaller than N (Yes in operation BF), the process returns to operation BE. When the loop variable n is larger than N (No in operation BF), the process proceeds to operation BG. By repeatedly executing operation BE on variables 1 to N, the least mean square errors Err (m1, m2, . . . and mN) for a single combination of phase difference candidates are stored in the variable Err.

In operation BG, the evaluation value calculator 43 outputs the least mean square errors Err calculated for the single combination of the phase difference candidates. In operation BHN, the evaluation value calculator 43 determines whether or not the variable mN is equal to or smaller than M. When the variable mN is equal to or smaller than M (Yes in operation BHN), the process returns to operation BB. When the variable mN is larger than M (No in operation BHN), the evaluation value calculator 43 executes a branch process for determining whether or not the next variable mN-1 is equal to or smaller than M. Then, the evaluation value calculator 43 repeats the same branch process as operation BHN in order of the variables mN-1, mN-2, . . . , m2 and m1 until the evaluation value calculator 43 determines whether or not the variables m2 and m1 are equal to or smaller than M in operations BH2 and BH1.

In the present embodiment, the range of the frequency deviation that is estimated on the basis of reference signals received at three or more different reception intervals can be enlarged, and it is possible to avoid a lack of the range of the frequency deviation to be estimated.

5. Fourth Embodiment

Another embodiment of the receiver is described below. The enlarged range deviation estimator 24 according to the fifth embodiment selects phase difference candidates determined on the basis of phase differences that have been estimated on the basis of a reference signal lastly received and are among combinations θ1 (m^1) and θ2 (m^2) selected by the combination selector 41. The enlarged range deviation estimator 24 according to the fifth embodiment calculates a frequency deviation on the basis of the selected phase difference candidates.

Figure 8:
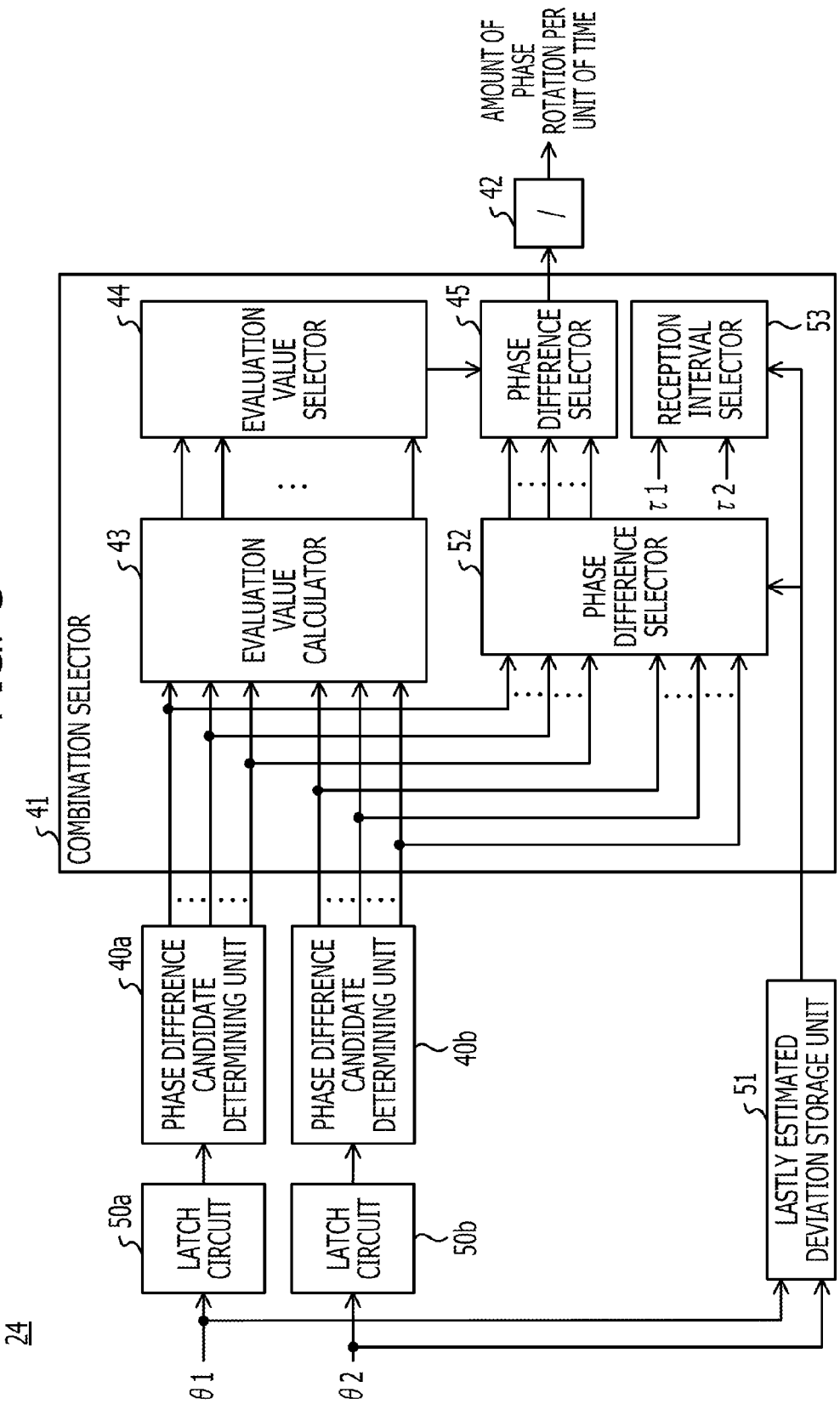
FIG. 8 is a functional block diagram illustrating a third example of the enlarged range deviation estimator.

FIG. 8 is a functional block diagram illustrating a third example of the enlarged range deviation estimator 24. In FIG. 8, constituent elements that are the same as the constituent elements illustrated in FIG. 4 are indicated by the same reference numerals and symbols as those illustrated in FIG. 4. A description of functions that are the same as the functions described with reference to FIG. 4 is omitted. The enlarged range deviation estimator 24 includes latch circuits 50a and 50b and a lastly estimated deviation storage unit 51. The combination selector 41 includes a phase difference selector 52 and a reception interval selector 53.

The latch circuits 50a and 50b latch phase differences θ1 and θ2 lastly received from the deviation estimators 30a and 30b, respectively. The lastly estimated deviation storage unit 51 stores information indicating whether the phase difference θ1 or θ2 has been lastly received. Specifically, the lastly estimated deviation storage unit 51 stores information indicating whether a phase difference that is estimated on the basis of a reference signal lastly received among reference signals received through the first and second channels is the phase difference θ1 or θ2.

The phase difference selector 52 references the lastly estimated deviation storage unit 51 and determines whether the phase difference θ1 or θ2 has been lastly received. The phase difference selector 52 selects, from among the phase difference candidates θ1(m) and θ2(m) for the reception intervals τ1 and τ2, phase difference candidates calculated from the phase difference lastly received, and outputs the selected phase difference candidates to the phase difference selector 45. The phase difference selector 45 selects, from among the phase difference candidates selected by the phase difference selector 52, phase difference candidates included in a combination for which an evaluation value selected by the evaluation value selector 44 has been calculated. Then, the phase difference selector 45 outputs the selected phase difference candidates to the frequency deviation calculator 42.

The reception interval selector 53 references the lastly estimated deviation storage unit 51 and determines whether the reference signal lastly received has been transmitted through the first or second channel. The reception interval selector 53 selects the reception interval τ1 or τ2 in which the reference signal has been lastly received. Then, the reception interval selector 53 outputs information of the selected reception interval to the frequency deviation calculator 42. The frequency deviation calculator 42 divides the phase difference candidates selected by the phase difference selector 45 by the reception interval selected by the reception interval selector 53 and thereby calculates a frequency deviation.

In the present embodiment, since a frequency deviation can be compensated for using a frequency deviation estimated on the basis of the latest reference signal, it is possible to improve performance for following a variation in the frequency deviation. In the fourth embodiment, the second and third embodiment may be combined.

6. Fifth Embodiment

Another embodiment of the receiver is described below. The enlarged range deviation estimator 24 according to the fifth embodiment outputs, to compensators 31a and 31b, the average of frequency deviations calculated from the combinations θ1(m^1) and θ2(m^2) selected by the combination selector 41.

Figure 9:
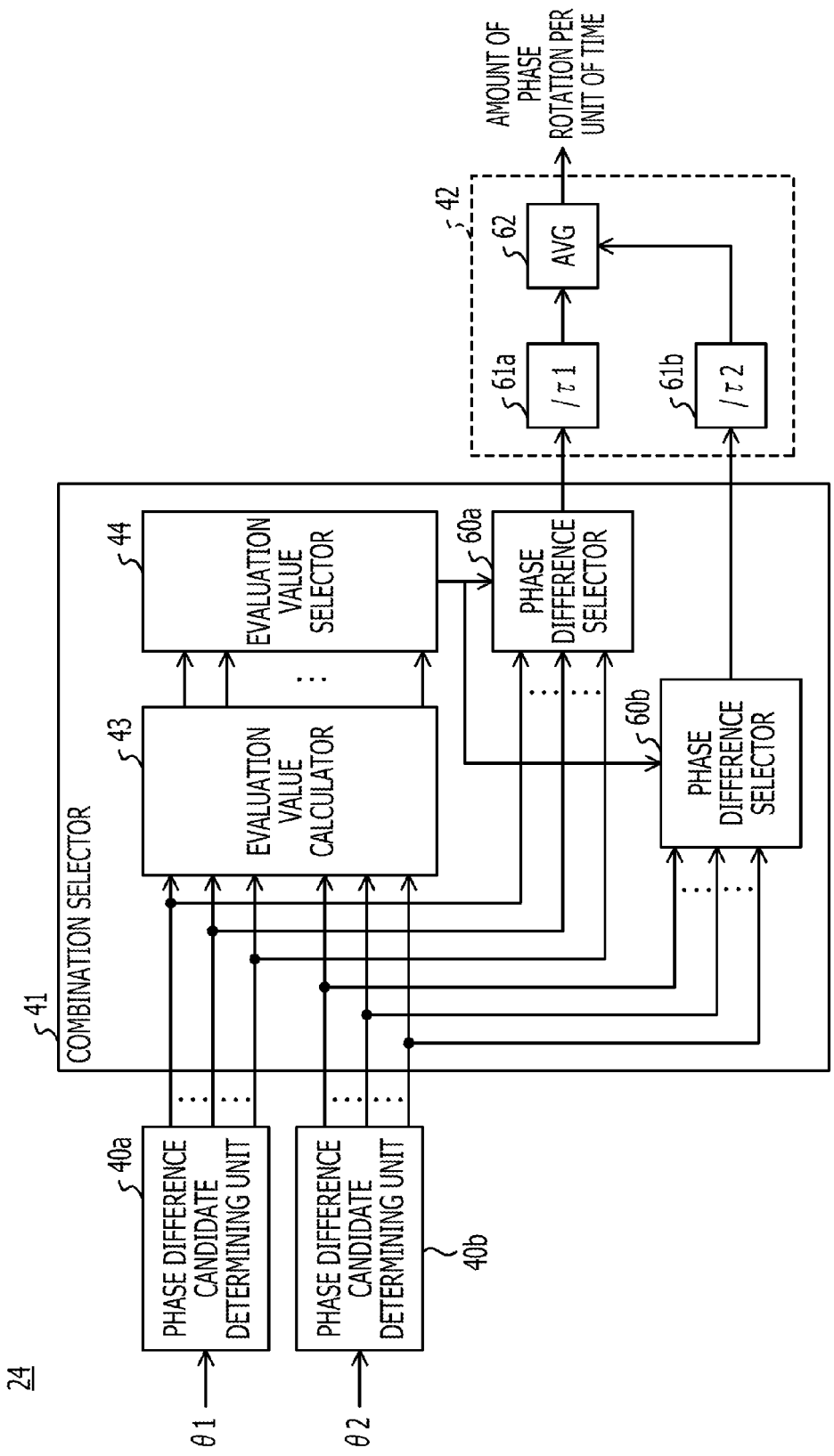
FIG. 9 is a functional block diagram illustrating a fourth example of the enlarged range deviation estimator.

FIG. 9 is a functional block diagram illustrating a fourth example of the enlarged range deviation estimator 24. In FIG. 9, constituent elements that are the same as the constituent elements illustrated in FIG. 4 are indicated by the same reference numerals as the reference numerals illustrated in FIG. 4. A description of functions that are the same as the functions described with reference to FIG. 4 is omitted. In the present embodiment, the enlarged range deviation estimator 24 includes phase difference selectors 60a and 60b, and the frequency deviation calculator 42 includes dividers 61a and 61b and an average calculator 62.

The phase difference selector 60a selects a phase difference candidate θ1(m^1) for the reception interval τ1, while the phase difference candidate θ1(m^1) for the reception interval τ1 is included in a combination of phase difference candidates for which an evaluation value selected by the evaluation value selector 44 has been calculated. Then, the phase difference selector 60a outputs the selected phase difference candidate θ1(m^1) to the divider 61a. The phase difference selector 60b selects a phase difference candidate θ2(m^2) for the reception interval τ2, while the phase difference candidate θ2(m^2) for the reception interval τ2 is included in a combination of phase difference candidates for which an evaluation value selected by the evaluation value selector 44 has been calculated. Then, the phase difference selector 60b outputs the selected phase difference candidate θ2(m^2) to the divider 61b.

The divider 61a divides the phase difference candidate θ1(m^1) by the reception interval τ1 and thereby calculates a frequency deviation (θ1(m^1)/τ1). The divider 61a divides the phase difference candidate θ2(m^2) by the reception interval τ2 and thereby calculates a frequency deviation (θ2(m^2)/τ2). The average calculator 62 calculates the average of the frequency deviations (θ1(m^1)/τ1) and (θ2(m^2)/τ2) and outputs the calculated average to the compensators 31a and 31b as a frequency deviation.

In the present embodiment, it is possible to improve the accuracy of estimating a frequency deviation by averaging frequency deviations estimated on the basis of a plurality of reference signals. In the fifth embodiment, the second and third embodiments may be combined.

7. Sixth Embodiment

7.1. Functional Configuration of Receiver

Figure 10:
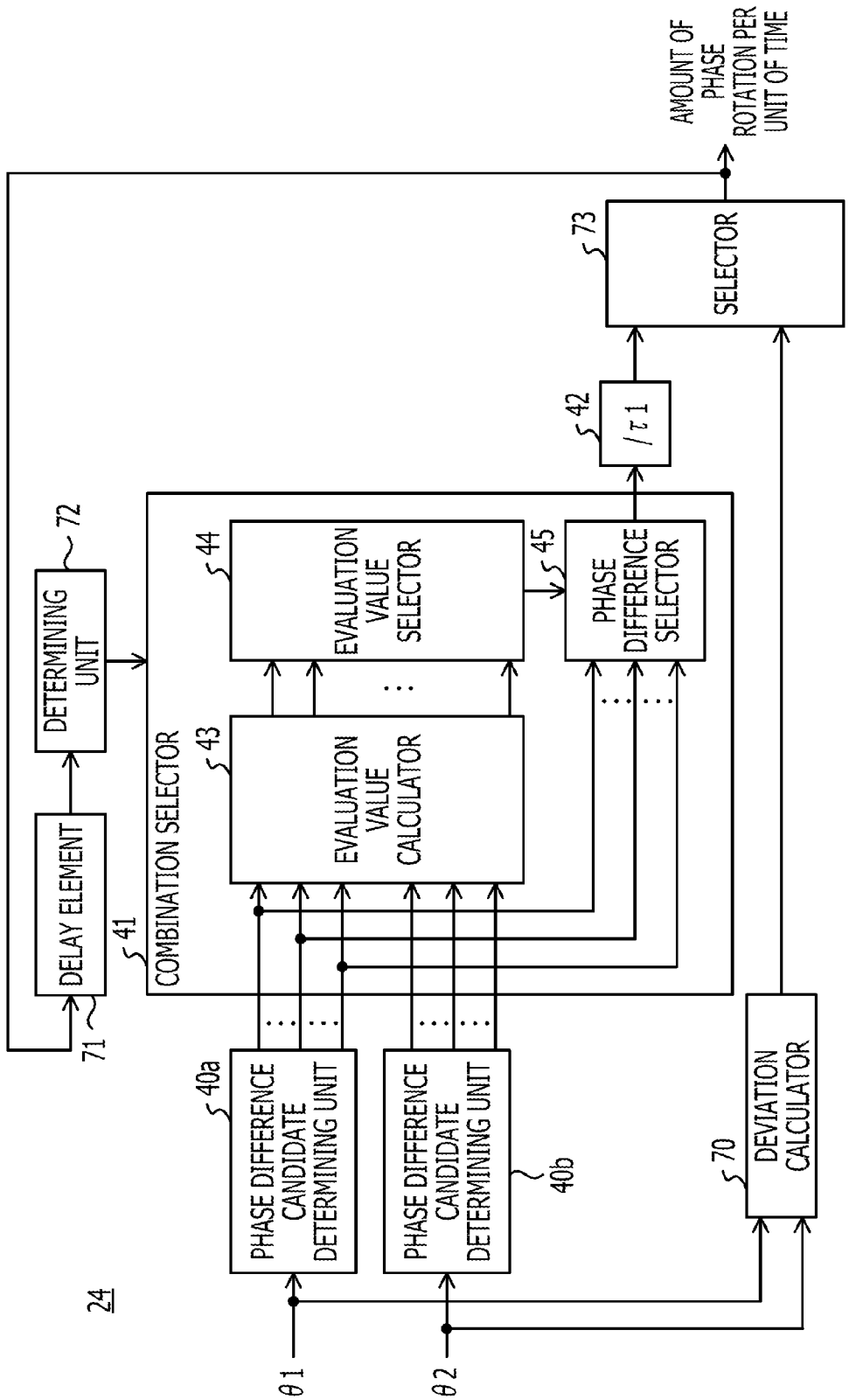
FIG. 10 is a functional block diagram illustrating a fifth example of the enlarged range deviation estimator.

Another embodiment of the receiver is described below. The enlarged range deviation estimator 24 according to the sixth embodiment dynamically switches whether to execute the enlarged range deviation estimation for each of users. FIG. 10 is a functional block diagram illustrating a fifth example of the enlarged range deviation estimator 24. In FIG. 10, constituent elements that are the same as the constituent elements illustrated in FIG. 4 are indicated by the same reference numerals as the reference numerals illustrated in FIG.

4. A description of functions that are the same as the functions described with reference to FIG. 4 is omitted.

The enlarged range deviation estimator 24 includes a deviation calculator 70, a delay element 71, a determining unit 72 and a selector 73. The deviation calculator 70 outputs, to the selector 73, any of frequency deviations obtained by dividing the phase differences θ1 and θ2 estimated by the deviation estimators 30a and 30b by the reception intervals τ1 and τ2 or outputs the average of the frequency deviations to the selector 73.

The delay element 71 delays a frequency deviation previously output from the enlarged range deviation estimator 24 to the compensators 31a and 31b, and outputs the delayed frequency deviation to the determining unit 72. The determining unit 72 determines whether or not the previously output frequency deviation is larger than a predetermined threshold Th. When the previously output frequency deviation is larger than the predetermined threshold Th, the determining unit 72 validates the enlarged range deviation estimation to be executed by the enlarged range deviation estimator 24. When the previously output frequency deviation is not larger than the predetermined threshold Th, the determining unit 72 invalidates the enlarged range deviation estimation to be executed by the enlarged range deviation estimator 24. In addition, if the enlarged range deviation estimation is invalid for a certain time period ΔT, the determining unit 72 validates the enlarged range deviation estimation.

When the enlarged range deviation estimation is valid, the selector 73 outputs a frequency deviation calculated by the frequency deviation calculator 42 to the compensators 31a and 31b. When the enlarged range deviation estimation is invalid, the selector 73 outputs a frequency deviation calculated by the deviation calculator 70 to the compensators 31a and 31b.

7.2. Process to be Executed by Receiver

Figure 11:
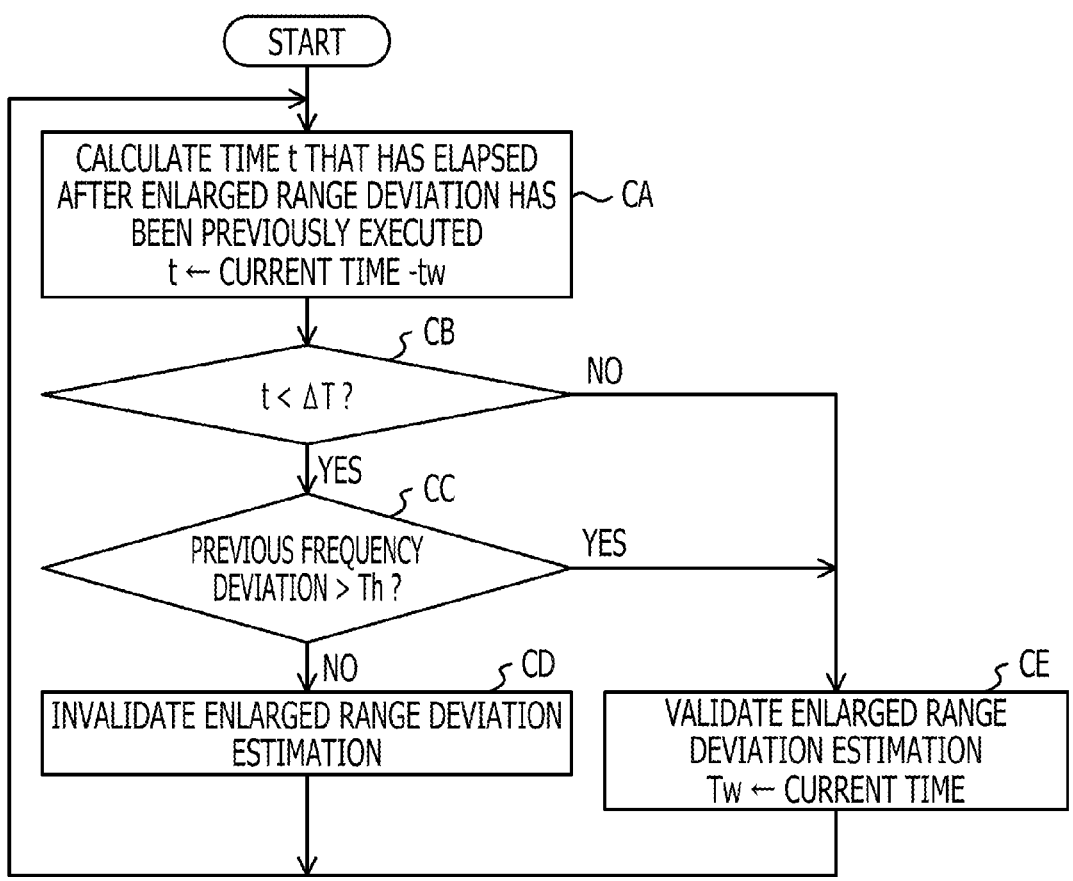
FIG. 11 is a diagram describing an example of a process that is executed by the enlarged range deviation estimator.

FIG. 11 is a diagram illustrating an example of a process that is executed by the enlarged range deviation estimator 24. In operation CA, the determining unit 72 calculates a time t that has elapsed after the enlarged range deviation estimation has been previously executed. In operation CB, the determining unit 72 determines whether or not a certain period time ΔT has elapsed after the enlarged range deviation estimation has been previously executed. When the certain period time ΔT has elapsed (No in operation CB), the process proceeds to operation CE. When the certain time period ΔT has not elapsed (Yes in operation CB), the process proceeds to operation CC.

In operation CC, the determining unit 72 determines whether or not a previously output frequency deviation is larger than the predetermined threshold Th. When the previously output frequency deviation is larger than the predetermined threshold Th (Yes in operation CC), the process proceeds to operation CE. When the previously output frequency deviation is not larger than the predetermined threshold Th (No in operation CC), the process proceeds to operation CD.

In operation CD, the determining unit 72 invalidates the enlarged range deviation estimation to be executed by the enlarged range deviation estimator 24. As a result, the frequency deviation calculated by the deviation calculator 70 is output to the compensators 31a and 31b. After that, the process returns to operation CA. In operation CE, the determining unit 72 validates the enlarged range deviation estimation to be executed by the enlarged range deviation estimator 24. As a result, the frequency deviation calculated by frequency deviation calculator 42 is output to the compensators 31a and 31b. The determining unit 72 stores the current time as a time to execute the enlarged range deviation estimation and causes the process to return to operation CA.

7.3. Effects of Embodiment

When the enlarged range deviation estimation is executed, a characteristic may be degraded due to an estimation error caused by an erroneous selection of a phase difference candidate, and the amount of data to be processed may increase. In the present embodiment, the enlarged range deviation estimator 24 can dynamically switch whether to execute the enlarged range deviation estimation for each of the users. Thus, it is possible to reduce the amount of data to be processed and the probability that an estimation error occurs. In the sixth embodiment, at least two of the first to fifth embodiments may be combined.

8. Seventh Embodiment

Another embodiment of the receiver is described below. The enlarged range deviation estimator 24 according to the seventh embodiment selects, from among the combinations θ1($m\hat{}1$) and θ2($m\hat{}2$) selected by the combination selector 41, a phase difference candidate determined on the basis of a phase difference estimated on the basis of a reference signal having a high reception quality, and calculates a frequency deviation.

Figure 12:
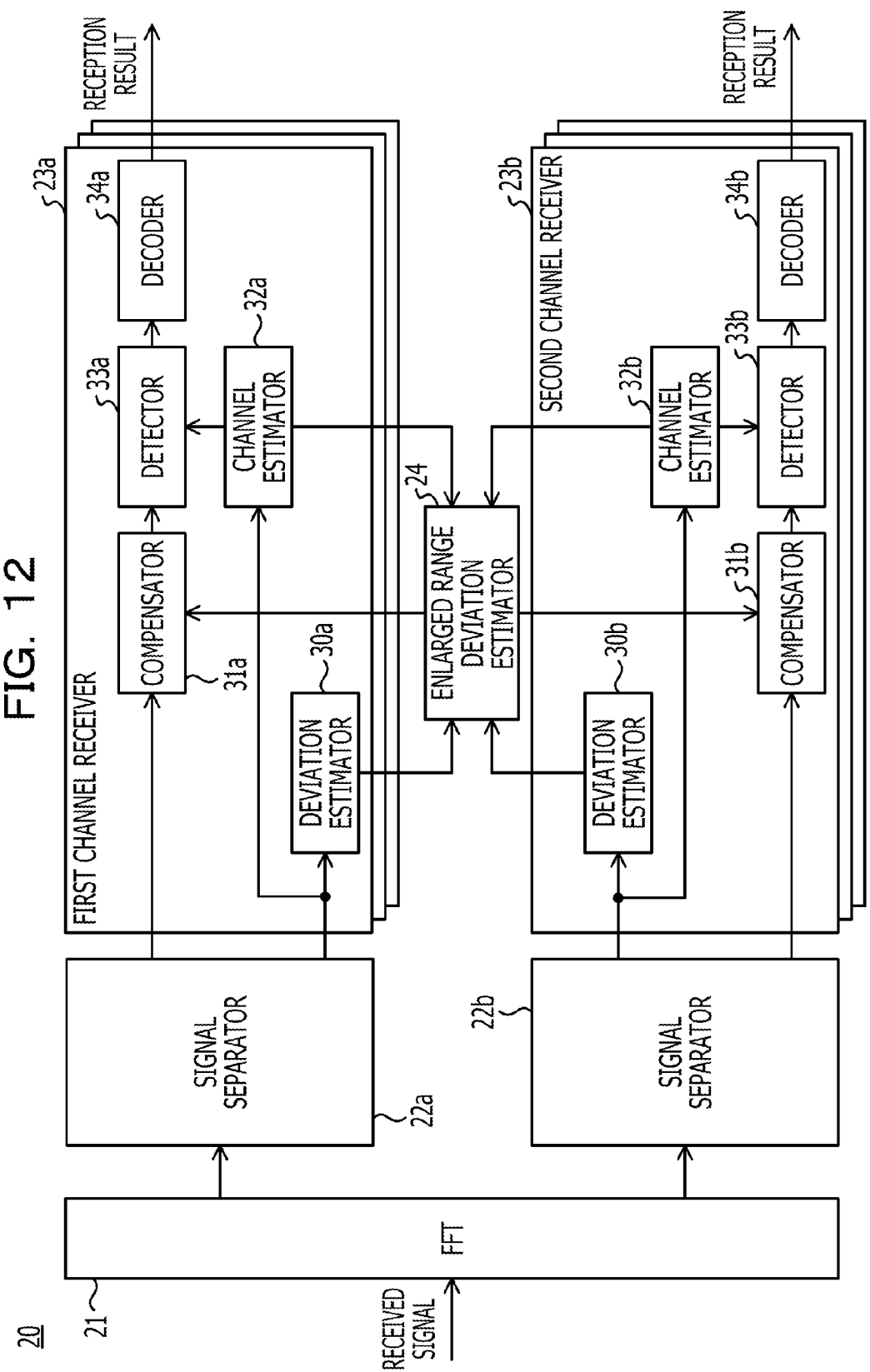
FIG. 12 is a functional block diagram illustrating a second example of the receiving circuit.

FIG. 12 is a functional block diagram illustrating a second example of the receiving circuit. In FIG. 12, constituent elements that are the same as the constituent elements illustrated in FIG. 3 are indicated by the same reference numerals and symbols as those illustrated in FIG. 3. A description of functions that are the same as the functions described with reference to FIG. 3 is omitted. The channel estimators 32a and 32b calculate signal-to-interference ratios (SIRs) for the first and second channels on the basis of propagation path values estimated from reference signals received through the first and second channels. The channel estimators 32a and 32b output the calculated SIRs to the enlarged range deviation estimator 24.

Figure 13:
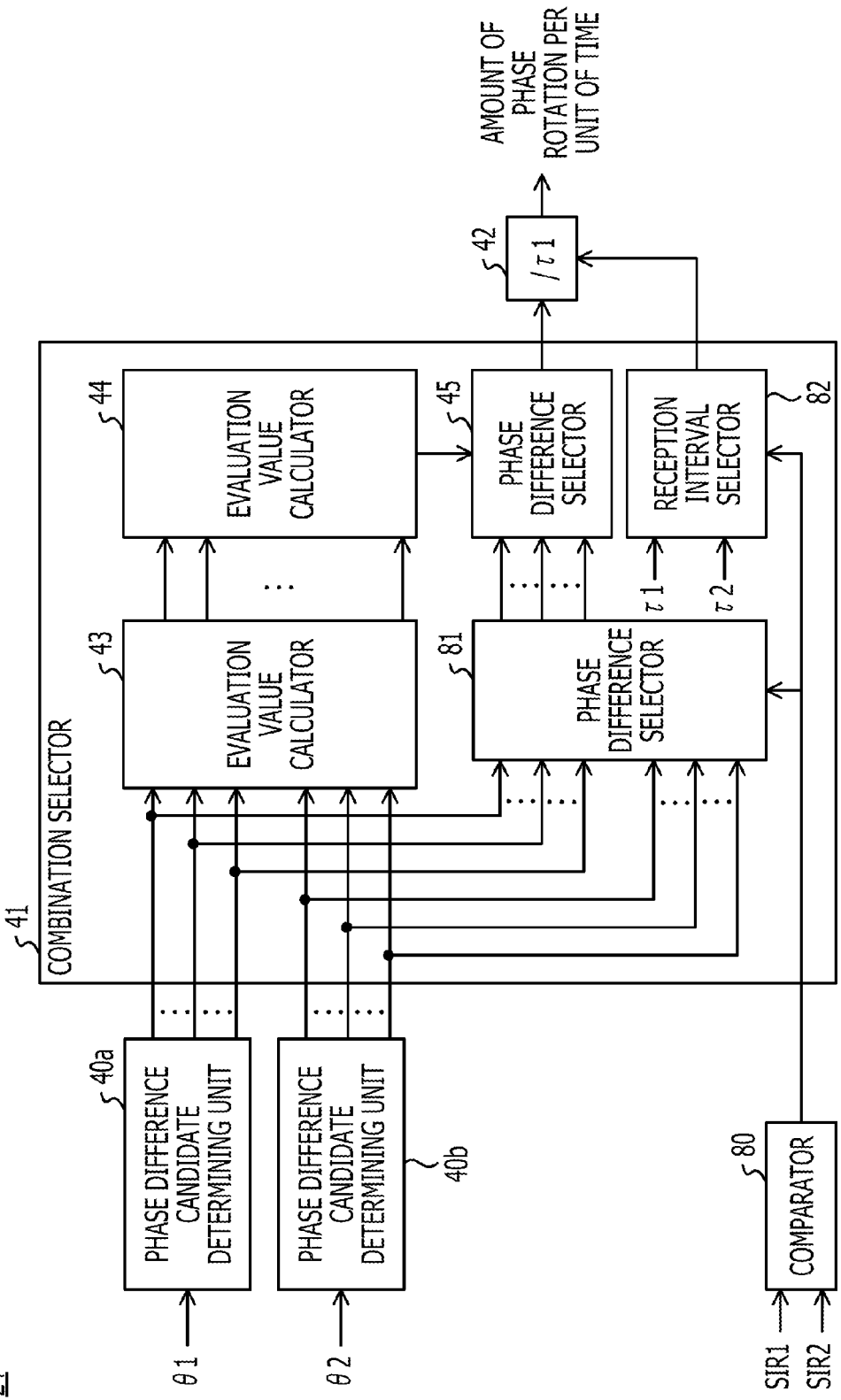
FIG. 13 is a functional block diagram illustrating a sixth example of the enlarged range deviation estimator.

FIG. 13 is a functional block diagram illustrating a sixth example of the enlarged range deviation estimator 24. In FIG. 13, constituent elements that are the same as the constituent elements illustrated in FIG. 4 are indicated by the same reference numerals and symbols as those illustrated in FIG. 4. A description of functions that are the same as the functions described with reference to FIG. 4 is omitted. The enlarged range deviation estimator 24 includes a comparator 80. The combination selector 41 includes a phase difference selector 81 and a reception interval selector 82.

The comparator 80 compares reception qualities of the first and second channels with each other and outputs the result of the comparison to the phase difference selector 81 and the reception interval selector 82. The phase difference selector 81 selects, from among the phase difference candidates θ1(m) and θ2(m), phase difference candidates determined on the basis of phase differences estimated on the basis of reference signals received through any of the first and second channels that has a higher reception quality. The phase difference selector 81 outputs the selected phase difference candidates to the phase difference selector 45. The phase difference selector 45 selects, from among the phase difference candidates selected by the phase difference selector 81, phase difference candidates included in a combination for which an evaluation value selected by the evaluation value selector 44 has been calculated. The phase difference selector 45 outputs the selected phase difference candidates to the frequency deviation calculator 42.

The reception interval selector 82 selects, from among the reception intervals τ1 and τ2, a reception interval at which the reference signals have been received through the channel having the higher reception quality. Then, the reception interval selector 82 outputs information of the selected reception interval to the frequency deviation calculator 42. The frequency deviation calculator 42 divides the phase difference candidates selected by the phase difference selector 45 by the reception interval selected by the reception interval selector 82 and thereby calculates a frequency deviation.

In the present embodiment, since a frequency deviation is estimated on the basis of reference signals received through a channel having a higher reception quality, the accuracy of estimating the frequency deviation can be improved. In the seventh embodiment, SIRs are used as indexes indicating reception qualities. In another embodiment, index values that are of another type and indicate the reception qualities may be used in order to select phase difference candidates. In the seventh embodiment, at least two of the second, third and fifth embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus comprising:
   a receiver to receive signals including reference signals at each of a plurality of different reception intervals; and
   a processor
      to estimate phase differences between the signals based on the reference signals,
      to determine a plurality of phase difference candidates for each of the plurality of different reception intervals based on the phase differences,
      to select, from among a plurality of combinations of the phase difference candidates for the plurality of different reception intervals, a combination of the phase difference candidates between the signals, and
      to estimate a frequency deviation of the signals based on the phase difference candidates included in the combination.

2. The communication apparatus according to claim 1, wherein the processor selects, from among the plurality of combinations of phase difference candidates, a combination that causes a straight line indicating a relationship between the reception intervals and phase difference candidates included in the combination to be closest to a straight line indicating a relationship between the reception intervals and phase differences caused by a frequency deviation.

3. The communication apparatus according to claim 2, wherein the processor selects, from among the plurality of combinations of phase difference candidates, a combination that causes an intercept of the straight line to be closest to the origin.

4. The communication apparatus according to claim 2, wherein the processor selects, from among the plurality of combinations of phase difference candidates, a combination that causes a least square error to be minimal when the straight line is formed so as to extend through the origin.

5. The communication apparatus according to claim 1, wherein the processor selects, from among the plurality of combinations of phase difference candidates, a combination that causes a difference between ratios of phase difference candidates of the combination to the reception intervals to be minimal as a combination of the phase differences between the signals.

6. The communication apparatus according to claim 1, wherein the processor estimates a frequency deviation based on a phase difference candidate that is among the phase difference candidates included in the combination and is determined from a reference signal lastly received.

7. The communication apparatus according to claim 1, wherein the processor estimates a frequency deviation based on a phase difference candidate that is among the phase difference candidates included in the combination and is determined from a reference signal selected based on reception qualities of the reference signals.

8. The communication apparatus according to claim 1, wherein the processor estimates the frequency deviation by calculating an average of frequency deviations estimated based on the phase difference candidates included in the combination.

9. The communication apparatus according to claim 1, wherein the processor switches, based on a magnitude of a previously estimated frequency deviation of signals, whether to execute to determine the plurality of phase difference candidates, select the combination of the phase difference candidates and the estimate the frequency deviation of the signals.

10. A communication method comprising:
receiving signals including reference signals at each of a plurality of different reception intervals;
estimating phase differences between the signals based on the reference signals;
determining a plurality of phase difference candidates for each of the plurality of different reception intervals based on the phase differences;
selecting, by a processor, from among a plurality of combinations of the phase difference candidates for the plurality of different reception intervals, a combination of the phase difference candidates between the signals; and
estimating a frequency deviation of the signals based on the phase difference candidates included in the combination.

11. The communication method according to claim 10, wherein the communication method selects, from among the plurality of combinations of phase difference candidates, a combination that causes a straight line indicating a relationship between the reception intervals and phase difference candidates included in the combination to be closest to a straight line indicating a relationship between the reception intervals and phase differences caused by a frequency deviation.

12. The communication method according to claim 11, wherein the communication method selects, from among the plurality of combinations of phase difference candidates, a combination that causes an intercept of the straight line to be closest to the origin.

13. The communication method according to claim 11, wherein the communication method selects, from among the plurality of combinations of phase difference candidates, a combination that causes a least square error to be minimal when the straight line is formed so as to extend through the origin.

14. The communication method according to claim 10,
wherein the communication method selects, from among the plurality of combinations of phase difference candidates, a combination that causes a difference between ratios of phase difference candidates of the combination to the reception intervals to be minimal as a combination of the phase differences between the signals.

15. The communication method according to claim 10,
wherein the communication method estimates a frequency deviation based on a phase difference candidate that is among the phase difference candidates included in the combination and is determined from a reference signal lastly received.

16. The communication method according to claim 10,
wherein the communication method estimates a frequency deviation based on a phase difference candidate that is among the phase difference candidates included in the combination and is determined from a reference signal selected based on reception qualities of the reference signals.

17. The communication method according to claim 10,
wherein the communication method estimates the frequency deviation by calculating an average of frequency deviations estimated based on the phase difference candidates included in the combination.

18. The communication method according to claim 10,
wherein the communication method switches, based on a magnitude of a previously estimated frequency deviation of signals, whether to execute to determine the plurality of phase difference candidates, select the combination of the phase difference candidates and the estimate the frequency deviation of the signals.

* * * * *